US010653066B2

(12) United States Patent
Peters et al.

(10) Patent No.: US 10,653,066 B2
(45) Date of Patent: May 19, 2020

(54) SLAT-BAR CROSS-MEMBERS IN A FEEDERHOUSE CROP-CONVEYING SYSTEM

(71) Applicant: Deere & Company, Moline, IL (US)

(72) Inventors: David W. Peters, Bettendorf, IA (US); Corwin M. Puryk, Bettendorf, IA (US); Michael T. Meschke, Geneseo, IL (US); Adam J. Donohoe, Bettendorf, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 16/102,380

(22) Filed: Aug. 13, 2018

(65) Prior Publication Data

US 2020/0045886 A1 Feb. 13, 2020

(51) Int. Cl.
*A01D 61/00* (2006.01)
*B65G 15/52* (2006.01)
(Continued)

(52) U.S. Cl.
CPC ............ *A01D 61/008* (2013.01); *B65G 15/52* (2013.01); *A01D 2017/103* (2013.01); *A01D 2017/106* (2013.01); *B65G 19/10* (2013.01)

(58) Field of Classification Search
CPC ...... B65G 15/52; B65G 19/10; A01D 61/008; A01D 2017/103; A01D 2017/106; A01D 61/02; A01D 61/04
See application file for complete search history.

(56) References Cited

U.S. PATENT DOCUMENTS 1,964,327 A 6/1934 Mollenkamp
2,687,209 A 8/1954 Rost et al.
(Continued)

FOREIGN PATENT DOCUMENTS

DE 202005008426 U1 9/2005
DE 102009036104 A1 2/2011
EP 0920797 A1 6/1999

OTHER PUBLICATIONS

Agricultural Technology, Delivery Program, Broekema Crop Conveyor Belts, May 3, 2017, 163 pages, Holland, https://www.broekema.nl/en/files/01.2017_Katalog_Extern_BroekemaNL_EN.pdf.
(Continued)

*Primary Examiner* — Mark A Deuble
(74) *Attorney, Agent, or Firm* — Foley & Lardner LLP (57) ABSTRACT

A feederhouse conveyor system for an agricultural harvesting machine is provided. The feederhouse conveyor system includes a power transmitting system. The power transmitting system includes first rollers, second rollers, and power transmitting bands. The power transmitting bands are configured to each transmit power between each of the first rollers and the second rollers. The feederhouse conveyor system also includes rigid cross members, configured to each attach near each end to at least one of the power transmitting bands, and flexible cross members configured to each attach near each end to at least one of the power transmitting bands. The centerlines which extend through the rigid cross members and the flexible cross members are parallel. The mat attaches to the flexible cross members by a pocket in the mat through which the flexible cross members extend.

23 Claims, 4 Drawing Sheets

(51) Int. Cl.
*A01D 17/10* (2006.01)
*B65G 19/10* (2006.01)

(56) References Cited

U.S. PATENT DOCUMENTS

| | | | |
|---|---|---|---|
| 3,785,472 A | | 1/1974 | Mathews |
| 4,899,868 A | | 2/1990 | Johnson |
| 5,478,277 A | * | 12/1995 | Kloefkorn ............ A01D 61/008 460/114 |
| 7,473,168 B2 | * | 1/2009 | Day ....................... A01D 61/04 460/16 |
| 7,766,736 B2 | * | 8/2010 | Ramp ..................... A01F 12/10 460/16 |
| 8,499,927 B2 | * | 8/2013 | Farley .................... F16G 13/06 198/851 |
| 8,701,870 B1 | * | 4/2014 | Farley ...................... B60P 1/36 198/727 |
| 9,253,945 B2 | * | 2/2016 | Farley .................... A01D 41/16 |
| 10,405,491 B2 | * | 9/2019 | Peters .................... A01D 61/02 |
| 2007/0072660 A1 | | 3/2007 | Day et al. |
| 2017/0339830 A1 | * | 11/2017 | Saraiva ................ A01D 61/008 |
| 2018/0027733 A1 | * | 2/2018 | Ravaglia ................ A01D 84/00 |

OTHER PUBLICATIONS

European Search Report issued in counterpart European Patent Application No. 19191020.7 dated Jan. 17, 2020 (4 pages).

* cited by examiner

SLAT-BAR CROSS-MEMBERS IN A FEEDERHOUSE CROP-CONVEYING SYSTEM

FIELD OF THE DISCLOSURE

The present specification relates generally to the field of agricultural harvesting equipment. More particularly, the present specification relates to a feeder house conveying system having rigid slats, flexible bars, and a mat.

BACKGROUND

Harvesting operations for crops such as corn, wheat, soybeans, and rice are often completed by agricultural machines that include multiple reciprocating knives at the leading edge of the machine. The reciprocating knives sever the crop plants at their roots, permitting the harvested crops to fall onto one or more belt conveyors before they are transported by a central conveyor to a feederhouse conveyor and transported into the combine for further processing and storage.

The feederhouse conveyor inside the feederhouse may become clogged when the crop being transported piles up against the leading edge of one of the slats which push the crop. This may cause acyclic and non-continuous delivery of the crop into the combine which is undesirable as it introduces higher loads to the feederhouse conveyor system. In severe cases, crop buildup may interfere with the rotary parts of the belt system and cause jamming. Crop buildup may also damage the crop, and decrease the efficiency of the feederhouse conveyor as well as the processing systems to which the crop is delivered.

SUMMARY

One embodiment relates to an endless feederhouse conveyor system for an agricultural harvesting machine. The feederhouse conveyor system includes a power transmitting system. The power transmitting system includes first rollers, second rollers, and one or more power transmitting bands. The power transmitting bands are configured to each transmit power between each of the first rollers and the second rollers. The feederhouse conveyor system also includes rigid cross members, configured to each attach near each end to at least one of the power transmitting bands, and flexible cross members configured to each attach near each end to at least one of the power transmitting bands. The centerlines which extend through the rigid cross members and the flexible cross members are parallel. In some embodiments, an optional mat is configured to attach to the flexible cross members. The mat attaches to the flexible cross members by a pocket in the mat through which the flexible cross members extend.

In some embodiments, the flexible bars are made of spring steel.

Some embodiments relate to an agricultural harvesting machine. The agricultural harvesting machine includes a combine, a harvesting head assembly, and a feederhouse assembly configured to transport crop up and rearward from the harvesting head assembly to the combine. The feederhouse assembly includes a feederhouse floor, power transmitting bands configured to receive power from one or more driving rollers, rigid slats fixedly connected near each end to neighboring power transmitting bands and positioned along the power transmitting bands in a staggered pattern, and flexible bars fixedly connected near each end to a power transmitting band. The flexible bars are parallel to the rigid slats. The cross-sectional shape of the rigid slats is taller than the cross-sectional shape of the flexible bars.

In some embodiments, the flexible bars are made of spring steel.

Some embodiments relate to a method for transporting crop into a combine with a feederhouse conveyor. The method includes applying a pushing force to the crop with a leading edge of rigid slats, applying a distributed load to the top of the crop positioned between rigid slats with flexible bars, and applying both the pushing force and the distributed load to the crop the entire length of the feederhouse conveyor until the crop is pushed into the combine. The rigid slats are attached near their ends to power transmitting bands, and the flexible bars are attached near their ends to power transmitting bands.

BRIEF DESCRIPTION OF THE DRAWINGS

Exemplary embodiments will become more fully understood from the following detailed description, taken in conjunction with the accompanying drawings, wherein like reference numerals refer to like elements, and.

DETAILED DESCRIPTION

Agricultural harvesters such as combines or windrowers, travel through fields of agricultural crop harvesting the crop. In one common arrangement, agricultural harvesting heads extend forward from the agricultural harvester to engage the plant stalks, sever them, and carry the severed crop into the body of the agricultural harvester itself for further processing. The agricultural harvesting heads are supported on feederhouses, which are boxlike structures that extend forward from the agricultural harvester. Feederhouses comprise hollow rectangular boxlike housings with an open front end and an open rear end. A feederhouse conveyor is fixed inside the housing. The feederhouse conveyor typically comprises a laterally extending front shaft extending through the sidewalls of the housing at the front of the housing where it couples to the agricultural harvesting head and a laterally extending rear shaft that extends through the sidewalls of the housing at the rear of the housing where it couples to the combine. Two endless chain belts extend around these two shafts, typically on toothed sprockets. Elongate slats are fixed to and between these two chain belts and extend laterally, generally parallel to the two shafts. As the two shafts rotate, they cause the chains or belts to recirculate, which in turn causes the slats to drag across the floor of the feederhouse housing. The slats extending downward from the lower run of the endless chains or belts grip the top of the cut crop material and drag it into the feederhouse. The slats drag the cut crop material upward on the floor of the feederhouse and release it into the combine itself.

What is needed is a conveyor that can provide a more continuous surface to prevent the clogging, uneven loading and jamming. Systems and methods discussed herein provide such a conveyor configuration in some embodiments.

Referring generally to the FIGURES, a feederhouse conveyor is depicted which uses two types of cross members, tall rigid slats which provide a pushing force to the crop, and smaller flexible bars according to some embodiments. The feederhouse conveyor may also use a mat which may be made of rubber, or any other sufficiently flexible material in some embodiments. The rigid slats and the flexible bars are fixedly attached to the outer perimeter of an endless belt or an endless chain which receives a power input from a gear, a cogged drive wheel, a sprocket, a pulley, a cogged drum, or more generally a drive wheel or a roller in some embodiments. The rigid slats and the flexible bars may be positioned perpendicular to the direction of travel of the endless belt or chain. The use of the rigid slats, the smaller flexible bars, and the mat decreases the accumulation of crop along the leading edge of the rigid slats, which provides an overall more continual and controlled delivery of crops to the combine for processing in some embodiments. Advantageously, this improves the efficiency of the processing systems in the combine, reduces damage to the crop, and reduces the likelihood of the conveyor jamming or experiencing excessive loads associated with the cyclic loading from crop accumulation along the leading edge of the slats in some embodiments. In some embodiments, a feederhouse conveyor is configured advantageously to reduce acyclic and non-continuous delivery of the crop and/or reduce crop accumulation along the leading edge of the slats to improve the efficiency and lifetime of various parts of the combine and conveyor system, and decrease the amount of damaged crops. In some embodiments, the systems and methods more efficiently transport the crop and reduce recirculation or churning, thereby reducing potential damage to the crop.

Figure 1:
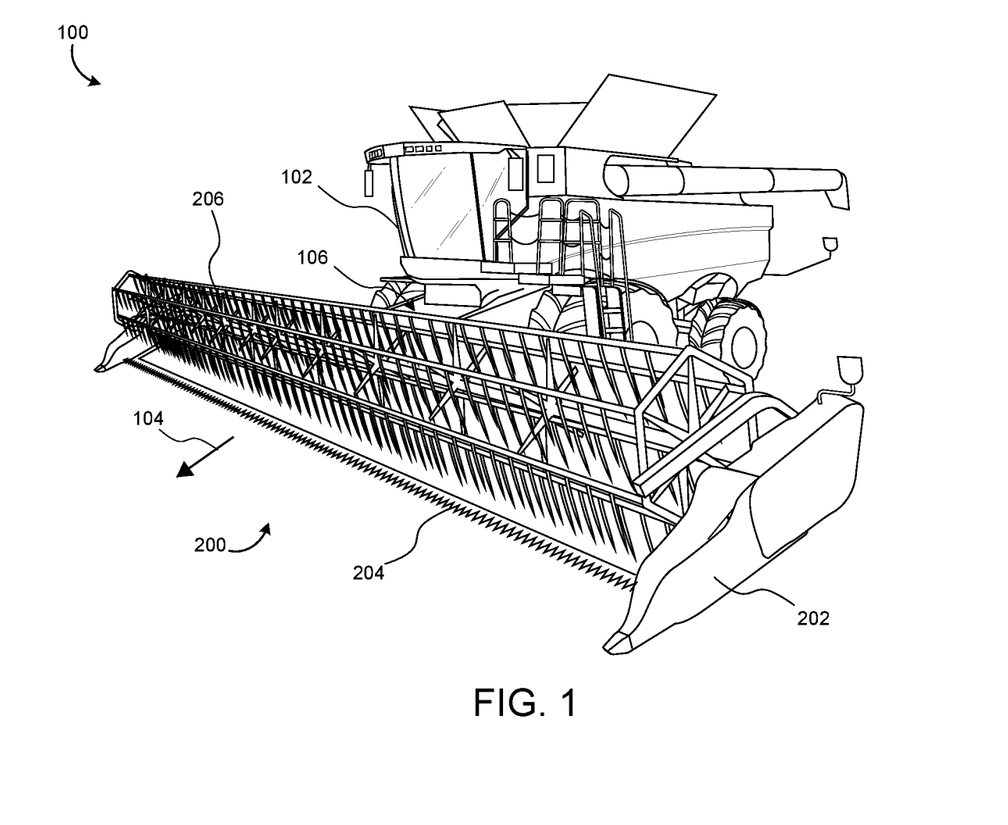
FIG. 1 is a perspective view of an agricultural harvester, including an agricultural harvesting head, and a feederhouse conveyor, according to some embodiments.

Referring now to FIG. 1, an agricultural harvester 100 includes a combine 102 equipped with a harvesting head assembly 200 supported on the front of the combine 102. The harvesting head assembly 200 includes a frame 202 that extends laterally across substantially the entire width of the harvesting head assembly 200. The frame 202 is attached to a feederhouse 106 of the combine 102.

As the agricultural harvester 100 travels in the direction indicated by an arrow 104, the reciprocating cutterbar assembly 204 is configured to sever crop plants at their roots, thereby freeing them from the soil. In some embodiments, harvesting head assembly 200 also includes a reel assembly 206 that is pivotally coupled to the frame 202 and includes metal or plastic teeth that grip plant stalks and push them towards the cutterbar assembly 204. Once severed, the plants are transported upward, rearward and to the center of the harvesting head assembly 200 and into the feederhouse 106. The feederhouse 106 is positioned between the harvesting head assembly 200 and the combine 102 and is configured to transmit the harvested crop material into the combine 102 for further processing and storage via a feederhouse conveyor 400 (see FIGS. 2-4) positioned inside of the feederhouse 106. The feederhouse 106 is in the general form of a box with two open and opposing ends. The feederhouse conveyor 400 (see FIGS. 2-4) is configured to transport crop which enters the first open end to the second open end, where the second open end is elevated relative to the first open end.

The harvesting head assembly 200 includes frame 202 that extends laterally across substantially the entire width of the harvesting head assembly 200. The frame 202 is configured to support the cutterbar assembly 204 and the reel assembly 206.

As the harvesting head assembly 200 travels in direction of the arrow 104 the cutterbar assembly 204 is configured to sever the stems of the crop plants, thereby freeing them from the soil. Once severed, the crop is directed rearward and to the feederhouse 106 near the center of frame 202.

In some embodiments, the harvesting head assembly 200 is supported on the feederhouse 106 on the front of the combine. The feederhouse 106 is configured to receive harvested crop material that passes underneath a feed drum and to transmit the harvested crop material into the agricultural combine via a feederhouse conveyor (not shown) positioned within the feederhouse for further processing and storage.

Figure 2:
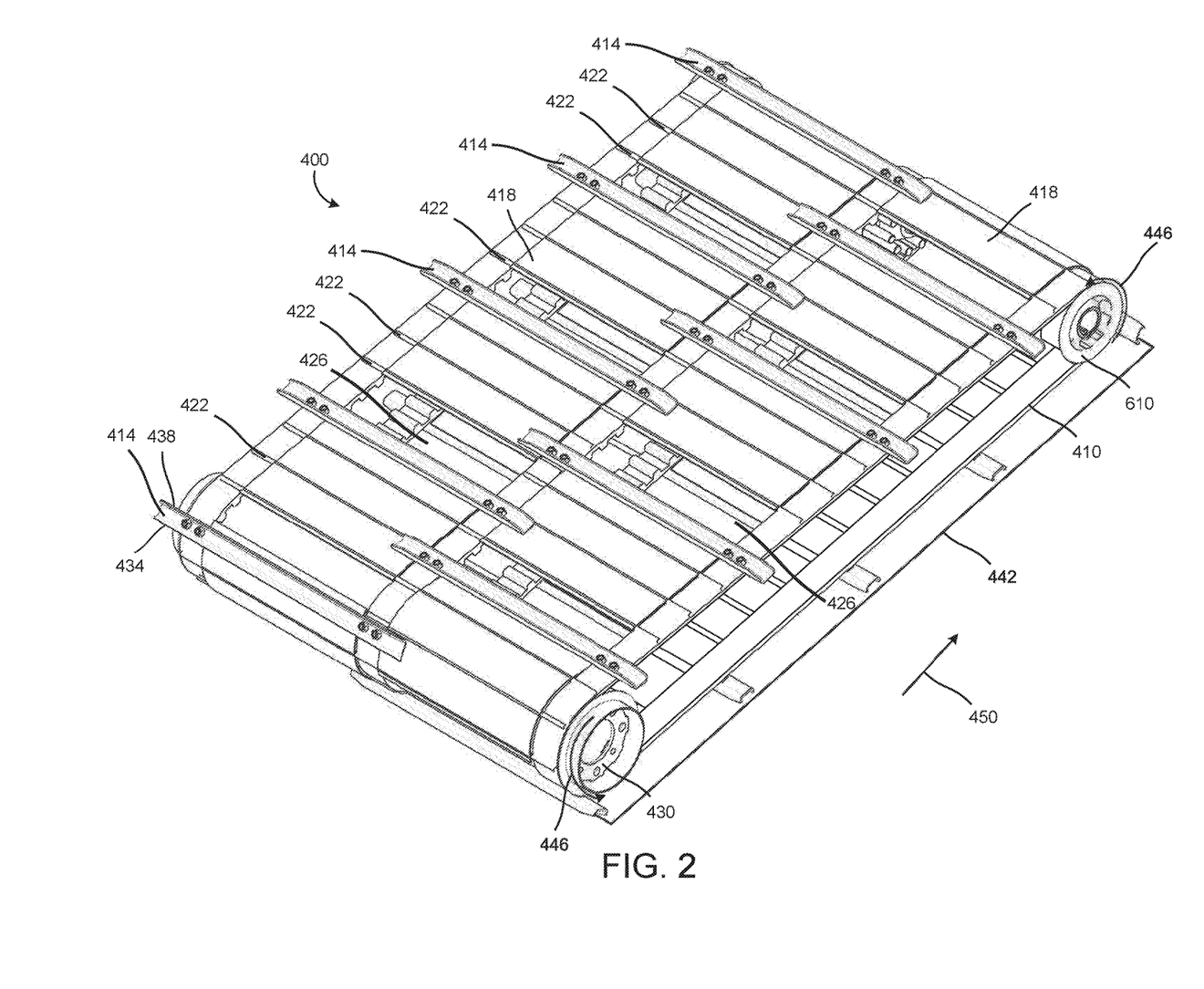
FIG. 2 is a perspective view of the feederhouse conveyor of FIG. 1, depicting cogged belts, slats, flexible bars, and a mat, according to some embodiments.
Figure 3:
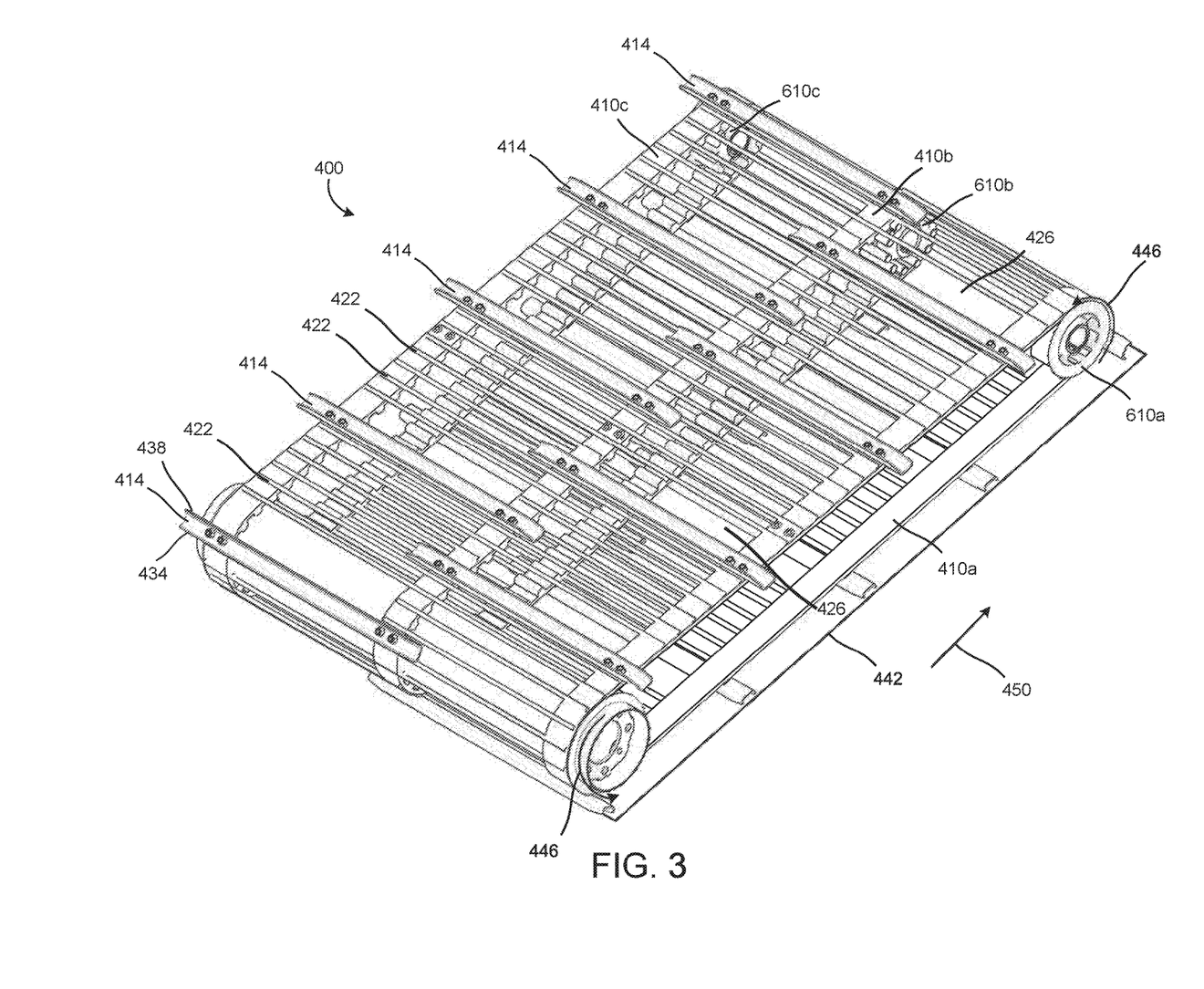
FIG. 3 is a perspective view of the feederhouse conveyor of FIG. 1, according to some embodiments.

Referring now to FIGS. 2-3, the feederhouse conveyor 400 configured as an endless feederhouse conveyor is depicted, according to some embodiments. The feederhouse conveyor 400 includes multiple bands (e.g, belts or chains) which can be configured as endless belts 410a, 410b, and 410c (FIG. 3), which each interface with an outer diameter of a cogged drum 430, and an outer diameter of a set of cogged drive wheels 610a, 610b, and 610c (FIG. 3), which are supported by the feederhouse conveyor frame (not shown). In some embodiments, two sets of cogged drive wheels 610 are used, one of the sets replacing the cogged drum 430. In some embodiments, two cogged drums 430 are used, with one of the cogged drums 430 replacing the cogged drive wheels 610a, 610b, and 610c. The cogged drum 430 may be mounted to a first driveshaft (not shown) and cogged drive wheels 610a, 610b, and 610c, may be mounted to a second driveshaft (not shown). The feederhouse conveyor frame may attach to a connecting portion (not shown) of the combine 102 in some embodiments. The feederhouse conveyor 400 also includes slats 414 fixedly attached to the endless belts 410a, 410b, and 410c, flexible bars 422 also fixedly attached to the endless belts 410a, 410b, and 410c, and a mat 418 in some embodiments.

The feederhouse conveyor 400 operates by driving the endless belts 410 with either cogged drive wheels 610a, 610b, and 610c, or with cogged drum 430. The cogged drive wheels 610a, 610b, and 610c, and the cogged drum 430 rotate in a direction 446. A leading edge 434 of the slats 414, which are fixedly attached to the endless belts 410 in some embodiments, engages the crop and provides a pushing force to the crop in a direction 450, moving the crop upwards and further into the combine 102 along a feederhouse floor 442 in some embodiments. In some embodiments, the mat 418 includes rubber members and pocketed sections through which the flexible bars 422 extend. The flexible bars 422 are enclosed in the mat 418 and attach near their ends to the endless belts 410, in some embodiments. In some embodiments, the mat 418 and the flexible bars 422 are configured on the feederhouse conveyor 400 to provide a surface between neighboring endless belts 410 and adjacent flexible bars 422. The flexible bars 422 and mat 418 do not necessarily provide a pushing force in the direction 450 in some embodiments, but the flexible bars 422 and the mat 418 may prevent the crop from piling up along the leading edge 434 of the slats 414, which is discussed further below. The mat 418 may not be present in some embodiments. In some embodiments, the flexible bars 422 may have a variety of shapes and cross sectional shapes, including but not limited to: rectangular, square, circular, oval, etc.

Figure 4:
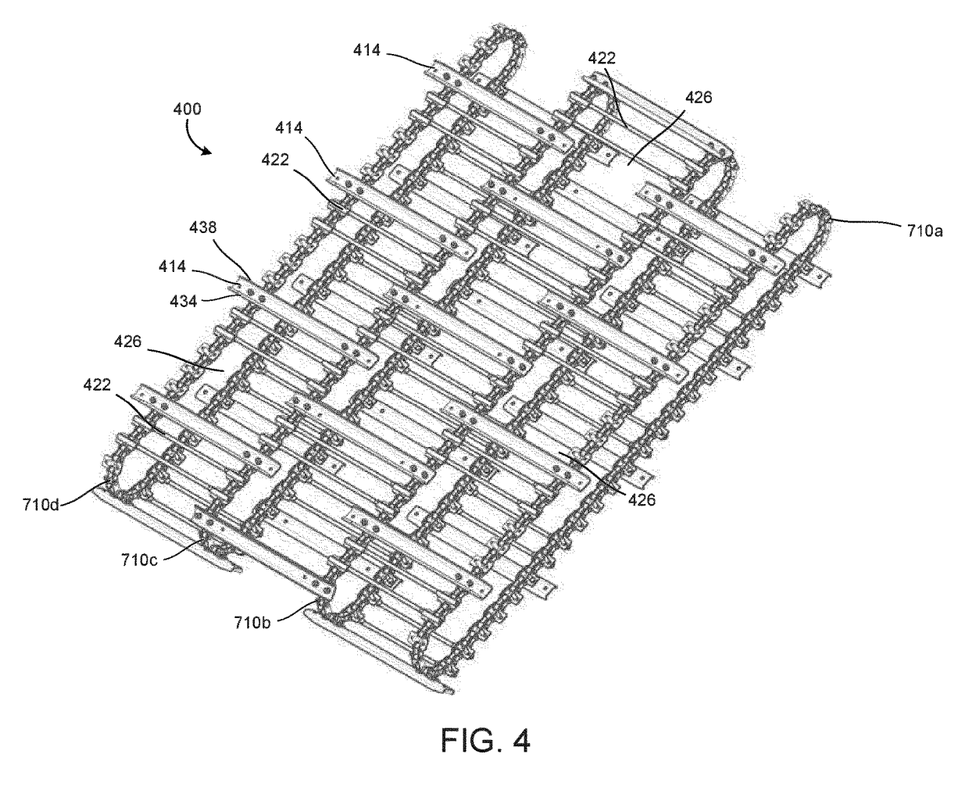
FIG. 4 is a perspective view of the feederhouse conveyor of FIG. 1, according to some embodiments.

Bands such as endless belts 410a, 410b, and 410c (which are cogged belts), non-cogged belts, endless chains (as shown in FIG. 4), or any other endless power transmitting bands are utilized to move the feederhouse conveyor 400. In some embodiments, the endless belts 410a, 410b, and 410c, are driven by the cogged drum 430, while the cogged drive wheels 610 idle (i.e., are driven by the power transferred through the endless belts 410). In some embodiments, the endless belts 410a, 410b, and 410c, may be driven by the cogged drive wheels 610a, 610b, 610c, while the cogged drum 430 idles. In some embodiments, both the cogged drum 430 and the cogged drive wheels 610 may drive the endless belts 410.

The interface between the endless belts 410 and the cogged drive wheels 610 and cogged drum 430, may be either a frictional interface, as in the case of a simple belt drive system, or a sprocket interface as in the case of an endless chain drive system. In the case of an endless chain drive system (as shown in FIG. 4), a tooth from a driving sprocket interfaces with the chain links to transmit power to the endless chain which powers the feederhouse conveyor 400. In the case of an endless cogged belt system (i.e., an endless timed belt system, an endless synchronous belt system, an endless toothed belt system, as shown in FIGS. 2-3), the cogged belt interfaces with cogs on the driving wheels to transmit power from the driving wheels to the cogged belt.

Any number of endless belts 410 may be used. For example, FIGS. 2-3 show three endless belts 410a, 410b, and 410c. However, in some embodiments, more or less than three endless belts 410 are used. In some embodiments, endless belts 410 are evenly spaced from each other, while in some embodiments, endless belts 410 are not evenly spaced from each other. In some embodiments with multiple endless belts 410, one set of the endless belts 410 may be evenly spaced, while another set of the endless belts 410 are not evenly spaced. Endless belts 410 may also be spaced according to any other pattern (e.g., two sets of equally spaced endless belts 410, with the two sets of equally spaced endless belts 410 being a distance from each other which is not equal to the spacing of the endless belts 410 in each cogged belt set).

Still referring to FIGS. 2-3, the feederhouse conveyor 400 includes slats 414. In some embodiments, the slats 414 have a cross-sectional shape that is U-shaped. Alternatively, the cross-sectional shape of the slats 414 may be square, circular, generally U-shaped, T-shaped, I-shaped, etc., or any other suitable cross-sectional shape. In some embodiments, all of the slats 414 have the same cross-sectional shape, while in some embodiments the cross-sectional shape of the slats 414 may vary from one slat 414 to another. In some embodiments, the cross-sectional shape of the slats 414 along the length of the slats may be non-uniform (i.e., the slats 414 have a varying cross-sectional shape along the length of the slats 414). The U-shaped cross-section is advantageous since it increases the area moment of inertia relevant to the direction of the applied bending force introduced to the slats 414 when the feederhouse conveyor 400 is in operation (i.e., the slats are under a force load applied on the leading edge of the slats 414 while during operation). Additionally, the U-shaped cross section reduces the amount of material of the slats 414. This reduces the weight and mass of the slats 414 which results in a lower amount of power required to drive the feederhouse conveyor 400 while providing strength and rigidity. The U-shaped cross section of the slats 414 is also advantageous since it is less expensive to produce due to the decreased amount of required material. The cross-sectional shape of the slats 414 may be taller than the cross-sectional shape of the flexible bars 422. This results in the slats 414 being the primary movers of the crop during normal operation of the feederhouse conveyor 400, and so slats 414 provide the majority of the force required to transport the crop along the feederhouse floor (not shown), as well as receiving the majority of a load or an impact associated with the introduction of a foreign object to the feederhouse conveyor 400.

The slats 414 are made of a rigid, high-strength material. Slats 414 may be produced from any steel, metal, or other suitably strong material. Sometimes during operation of the feederhouse conveyor 400, foreign objects will be picked up (e.g., rocks, wood, fossils, metal pieces, debris, etc.) and transported by the feederhouse conveyor 400. Since the slats 414 have a taller cross-sectional shape than the cross-sectional shape of the flexible bars 422, they receive the majority of the load associated with moving or impacting the foreign object. The slats 414 are better suited to receive the majority of the load from a foreign object due to their high-strength rigid material, and their cross-sectional shape and area which provides a suitable area moment of inertia for the loads associated with impacting a foreign object.

Still referring to FIGS. 2-3, the slats 414 are fixedly connected near their ends to the endless belts 410a, 410b, and 410c in some embodiments. In some embodiments, the slats 414 attach near their ends to the neighboring endless belts 410a and 410b, or 410b and 410c. For example, as shown in FIG. 3, a particular slat 414 may be connected near its ends to endless belts 410a and 410b, and another slat 414 may be connected near its ends to endless belts 410b and 410c. Slats 414 may be shorter in length than the distance between the outermost endless belts 410a and 410c. In some embodiments, slats 414 may be equal to or longer than the distance between outermost endless belts 410a and 410c, and are connected at their ends to the outermost endless belts 410a and 410c. In some embodiments, a combination of slats 414 connected to the outer endless belts 410a and 410c, and slats 414 connected to neighboring endless belts 410a and 410b (or 410b and 410c) may be used. The length of slats 414 may be uniform, or there may be more than one set of slats 414 with different lengths. For example, some of the slats 414 may be 24 inches in length, while other slats 414 are 36 inches in length.

In some embodiments, more than two endless belts 410 are included and slats 414 may be staggered in their position on the endless belts 410, as shown in FIGS. 2-3. For example, the centerlines of slats 414 (where the centerline of slat 414 is a line which extends normally through a cross-sectional view of slat 414) which are attached near their ends to endless belts 410a and 410b may be non-colinear with the centerlines of corresponding slats 414 which are connected near their ends to endless belts 410b and 410c. The centerlines of slats 414 which are attached near their ends to endless belts 410a and 410b and the centerlines of slats 414 which are connected near their ends to endless belts 410b and 410c may be parallel while still being non-colinear. In some embodiments, slats 414 may have centerlines which are all parallel to each other, or may have centerlines which are not all parallel to each other.

The configuration of the slats 414, and their cross-sectional shape provide advantages in some embodiments. The slats 414 provide a rigid high-strength member to absorb the majority of impact loads due to foreign objects in some embodiments. The staggered configuration of slats 414 may reduce the likelihood of crop accumulation along the leading edge 434 of slats 414 which may occur if the slats 414 were not staggered. The staggered configuration allows material to fall back to a more rearward slat 414 if crops accumulate along leading edge 434 of a more upper slat 414, which would not be possible if only slats 414 that extend to the outermost endless belts 410*a* and 410*c*, across the entire width of the feederhouse conveyor 400 were used.

Still referring to FIGS. 2-3, feederhouse conveyor 400 includes flexible bars 422 which have a circular cross-sectional shape. In some embodiments, flexible bars 422 may have a square cross-sectional shape, a hexagonal cross-sectional shape, generally circular, etc., or any other appropriate cross-sectional shape. The cross-sectional shape of flexible bars 422 are such that they are not taller than the cross sectional shape of the slats 414. For example, when the feederhouse conveyor 400 is in operation, the slats 414 protrude further outwards than the flexible bars 422 and therefore the slats 414 engage and provide a majority of the pushing force to the material or objects to be transported. In some embodiments, bars 422 may have an area moment of inertia less than the slats 414.

Flexible bars 422 allow a certain amount of deflection (e.g., bending) during operation of feederhouse conveyor 400 in some embodiments. The deflection may generally occur in a direction which is normal to both the direction 450 of travel and the centerline of the flexible bars 422. Flexible bars 422 may be made of spring steel, graphite, aluminum, etc., or any other material which has properties to provide the desired amount of deflection during use (e.g., a material with a suitable Young's Modulus) yet still has sufficient strength (e.g., a sufficient yield strength). Both the cross-sectional shape of the flexible bars 422 and the material of flexible bars 422 may cause them to undergo more deflection than slats 414 during operation of feederhouse conveyor 400 in some embodiments.

Still referring to FIGS. 2-3, the flexible bars 422 are attached near their ends to endless belts 410 in some embodiments. Flexible bars 422 may attach to the ends of outermost endless belts 410 (e.g., 410*a* and 410*c* in FIG. 3), or may attach near their ends to neighboring endless belts 410 (e.g., 410*a* and 410*b* in FIG. 3). In some embodiments, some of the flexible bars 422 attach near their ends to outermost endless belts 410 (e.g., 410*a* and 410*c* in FIG. 3), while other flexible bars 422 attach near their ends to neighboring endless belts 410 (e.g., 410*a* and 410*b* in FIG. 3). FIG. 2 shows some of the flexible bars 422 attached to outermost endless belts 410 and in their center attached to central endless belt 410, while other flexible bars 422 are attached near their ends to neighboring endless belts 410. In some embodiments, flexible bars 422 may have a set of two connections near each end, resulting in four connection points on each flexible bar 422 if the flexible bars 422 connect to the endless belts 410 or the endless chains 710 near only their ends. In some embodiments, some or all of the flexible bars 422 connect to every endless belt 410 or endless chain 710. For example, if there are three endless belts 410, and a flexible bar 422 extends across all three endless belts 410, the flexible bar 422 may have two connections to each endless belt 410 (a set of two connections near one end, a set of two connections in the middle, and a set of two connections near the other end), resulting in a total of six connections. In some embodiments, the connections of flexible bars 422 may be a rivet, a bolt, etc., or any other suitable connecting hardware. Advantageously, the use of the set of two connections wherever flexible bars 422 connect to endless belts 410 or endless chains 710 may reduce the likelihood that the flexible bars 422 will bend in a direction parallel to the direction 450 of 450, which may occur when there is only one connection. The set of two connections near each connecting point of flexible bars 422 introduces a fixed joint to the flexible bars 422, rather than a pinned joint (which would result from only one connection), which reduces a degree of freedom (i.e., a rotational degree of freedom about the pinned joint).

Flexible bars 422 may be uniformly spaced along endless belts 410 at any suitable distance. In some embodiments the distance between the flexible bars 422 is equal to a pitch of the endless belts 410 (when the endless belts 410 are cogged belts). The distance between flexible bars 422 may be equal to half the pitch of the endless belts 410, twice the pitch of the endless belts 410, etc., or any other distance. In some embodiments, the flexible bars 422 are non-uniformly spaced. For example, some of the flexible bars 422 may be spaced a distance equal to half the pitch of the endless belts 410, while other flexible bars 422 may be spaced a distance equal to the pitch of the endless belts 410. Flexible bars 422 may be staggered similar to slats 414. In some embodiments, the centerlines of flexible bars 422 are parallel, while in some embodiments the centerlines of flexible bars 422 are non-parallel. In some embodiments, the centerlines of flexible bars 422 may be parallel to the centerlines of slats 414. In some embodiments, the patterned position of flexible bars 422 may be configured so that they allow an open space 426 rearward of the trailing edge 438 of slats 414. In some embodiments, the patterned position of flexible bars 422 are configured so that they allow the open space 426 in front of the leading edge 434 of slats 414. In some embodiments, the patterned position of flexible bars 422 are configured so that they allow an open space 426 in front of the leading edge 434 of slats 414, and an open space 426 rearward of the trailing edge of slats 414. For example, a flexible bar 422 as shown in FIG. 3 may extend between endless belt 410*c* and 410*b*, without extending to endless belt 410*a*. This would provide the open space 426 between endless belts 410*b* and 410*a* where the flexible bar 422 does not extend.

Still referring to FIGS. 2-3, in some embodiments the mat 418 encloses flexible bars 422, yet does not enclose the parts of flexible bars 422 where the flexible bars 422 connect to the endless belts 410. In some embodiments, the mat 418 also encloses the connection area of flexible bars 422. In some embodiments, the mat 418 extends between the endless belts 410 and provides a surface between neighboring endless belts 410 and adjacent flexible bars 422. In some embodiments, the mat 418 may have open spaces 426, which allow crop or foreign objects to pass through. The open spaces 426 may be positioned in a location where there are no flexible bars 422 present (as described above), or may be positioned over flexible bars 422. In some embodiments, the open spaces 426 may also be in front of the leading edge 434 of slats 414. In some embodiments, there are no open spaces 426 in mat 418.

The open spaces 426 may allow accumulation of crop or foreign objects to pass through and fall back down to be re-transported by feederhouse conveyor 400. This allows accumulated crop or foreign objects an exit path so that they do not build up along leading edge 434 of slats 414. Advantageously, this reduces the likelihood of crop or foreign objects clogging the endless belts 410 or becoming clogged between the top and bottom portions of endless belts 410 in some embodiments. Clogged endless belts 410 can damage the feederhouse conveyor 400 by forcibly introducing crop between the endless belts 410 and the cogged drum 430 or the cogged drive wheels 610. Furthermore, clogged endless belts 410 can decrease the efficiency of feederhouse conveyor 400 by deteriorating and damaging any rotational parts present (such as bearings), and introducing an additional load to the driving wheel (either cogged drum 430 or cogged drive wheels 610 or both).

The flexible bars 422 and/or the mat 418 also reduce the likelihood that the crop will accumulate along leading edges 434 of the slats 414 in some embodiments. The flexible bars 422 and/or the mat 418 accomplish this by applying a distributed load to the crop, which distributes the crop more evenly between subsequent slats 414, and ensures that the crop will remain distributed between subsequent slats 414 during operation. A frictional interface between the mat 418 and the crop holds the crop in place and reduces the likelihood that the crop will fall back and accumulate along the leading edge 434 of slats 414. When this occurs, it introduces acyclic delivery of tightly packed crop into the combine 102, which can be harmful to processing systems (not shown) in the combine 102. Furthermore, it introduces cyclic loading to the feederhouse conveyor 400, which can be harmful to the endless belts 410, cogged drum 430, cogged drive wheels 610, slats 414, bars 422, and mat 418. Advantageously, the mat 418 and/or the flexible bars 422 provide a more continual, controlled delivery of crop into the combine 102, which reduces the wear due to cyclic loading and improves the performance of processing systems in the combine 102. Additionally, the distributed load applied to the crop by the flexible bars 422 and/or the mat 418 may reduce the likelihood that the crop churns and rotates while it is being transported by feederhouse conveyor 400. Sometimes an uneven side-to-side loading of the belts occurs when the crop is introduced to the feederhouse conveyor 400 in bulked clumps which accumulate near different endless belts 410 (e.g., a clump of crop may be introduced to the feederhouse conveyor 400 near endless belt 410a, followed by a clump of crop introduced to the feederhouse conveyor 400 near endless belt 410b). When this occurs, a higher load is applied to one of the endless belts 410 (e.g., endless belt 410a) relative to another endless belt 410 (e.g., endless belt 410c). This can cause mis-timing of the endless belts 410 or the endless chains 710. For example, the load introduced to endless belt 410a may cause endless belt 410a to rotate at a slightly different speed than endless belt 410b or endless belt 410c. Advantageously, the use of flexible bars 422 introduce more stiffness into the endless belts 410 or the endless chains 710. This added stiffness due to the flexible bars 422 decreases the likelihood that mis-timing will occur between endless belts 410 or endless chains 710. The flexible bars 422 distribute the load more evenly among the endless belts 410 or the endless chains 710, thus reducing the unequal distribution of force among the endless belts 410 or the endless chains 710 and therefore reducing the likelihood of mis-timing of the belts 410 or the endless chains 710, which can lead to damage of the feederhouse conveyor 400.

The mat 418 may be produced from rubber or any other flexible material (e.g., a polymeric material, a fabric, etc.), and may be reinforced by a wire or fabric mesh inside of the mat 418. This increases the tensile strength of the mat 418 and decreases the likelihood that mat 418 will crack or fail over time.

The endless belts 410 may be made from reinforce rubber or any other flexible material with a suitable strength. In some embodiments, the endless belts 410 are reinforced with a wire or a fabric mesh integrally formed with the endless belts 410. In some embodiments, the exterior surface of the endless belts 410 is generally smooth. In some embodiments, the endless belts 410 are made of any material which provides suitable tensile strength for the feederhouse conveyor 400.

Additionally, the spacing of the flexible bars 422 and/or the mat 418 may have unique advantages depending on the type of crop being harvested in some embodiments. For example, if corn is being harvested, and the flexible bars 422 are spaced less than the average diameter of a typical corn cob, the flexible bars 422 may rotate the corn cobs so that they are axially aligned with the cogged drum 430 or the cogged drive wheels 610. This may result in less damage to the corn cobs while being transported by the feederhouse conveyor 400 into the combine 102.

Referring now to FIG. 4, the feederhouse conveyor 400 is shown according to some embodiments. FIG. 4 depicts four endless chains, 710a, 710b, 710c, and 710d, which are parallelly aligned but not equally spaced in some embodiments. Specifically, the distance between endless chains 710a and 710b is equal to the distance between endless chains 710d and 710c, but not equal to the distance between endless chains 710b and 710c in some embodiments. In some embodiments, the distances between the four endless chains 710a, 710b, 710c, and 710d are all equal. Slats 414 may be attached to the endless chains 710a, 710b, 710c, and 710d, near their ends and may have a U-shaped cross section. Slats 414 are positionally patterned in a staggered manner between endless chains 710a and 710b, 710b and 710c, and 710c and 710d in some embodiments. For example, the slats 414 which attach near their ends to endless chains 710a and 710b, are not collinear with the corresponding slats 414 that attach near their ends to endless chains 710b and 710c, yet are collinear with the corresponding slats 414 that attach near their ends to endless chains 710c and 710 d. All of the slats 414 shown in FIG. 4 have uniform length in some embodiments. In some embodiments, slats 414 may have non-uniform length, particularly if the spacing between endless chains 710 is not uniform. Feederhouse conveyor 400 is also shown to include flexible bars 422 which are positioned in front of the leading edge 434 of slats 414.

Flexible bars 422 are attached to neighboring endless chains 710. For example, a certain flexible bar 422 may be attached near its ends to endless chains 710a and 710b, while another flexible bar 422 may be attached near its ends to endless chains 710b and 710c. Flexible bars 422 are also positioned to allow an open space 426 directly behind the trailing edge 438 of slats 414. Flexible bars 422 may also be positioned to allow an open space 426 in front of the leading edge 434 of slats 414. In some embodiments, flexible bars 422 may be positioned to allow an open space 426 both in front of the leading edge 434 of slats 414, as well as behind the trailing edge 438 of slats 414. In some embodiments, the lengths of flexible bars 422 may create open spaces 426. For example, in some embodiments when the length of a particular flexible bar 422 is less than the distance between outermost endless chains 710a and 710c, the flexible bar 422 may connect near its ends to an outer endless chain (e.g., 710a) and an adjacent endless chain (e.g., 710b). This may result in an open space 426 between the opposing outermost endless chain (e.g., 710c) and the middle endless chain (e.g., 710b), to where the flexible bar 422 does not extend.

Referring generally to the figures, the mat 418 includes a first surface, pockets, and a second surface. The pockets may have a circular cross-sectional shape, however in some embodiments, the cross-sectional shape of the pockets may be square, hexagonal, etc., or any other shape suitable to interface with the flexible bars 422 which are seated in the pockets. The mat 418 may be configured such that the first surface faces outwards when on the feederhouse conveyor 400, or it may be configured to face inwards when on the feederhouse conveyor 400 (as shown in FIG. 2). The first surface is generally planar in some embodiments.

According to some embodiments, some of the flexible bars 422 may be spaced a distance equal to the pitch (T) of the endless belts 410 (when the endless belts 410 are cogged belts), while some of the flexible bars 422 may be spaced a distance equal to half of the pitch (T) of the endless belts 410. In some embodiments, the flexible bars 422 are all spaced an equal distance. The pockets of the mat 418 may be spaced according to the spacing of the flexible bars 422.

It should be understood that the particular embodiments shown and discussed herein are not the only ways in which the invention can exist. They are the currently preferred embodiments of the invention. One skilled in the art of agricultural harvester and agricultural harvesting belt design and manufacture can readily see other variations that would also fall within the scope of the appended claims.

What is claimed is:

1. A feederhouse conveyor system for an agricultural harvesting machine, the feederhouse conveyor system comprising:
    a power transmitting system comprising:
        a plurality of first rollers;
        a plurality of second rollers; and
        one or more power transmitting bands;
    a plurality of rigid cross members, configured to each attach near each end to at least one of the power transmitting bands;
    a plurality of flexible cross members, configured to each attach near each end to at least one of the power transmitting bands, wherein the plurality of flexible cross members are separate from and positioned apart from the plurality of rigid cross members along the power transmitting bands; and
    wherein centerlines which extend through the rigid cross members and the flexible cross members are parallel.

2. The feederhouse conveyor system of claim 1, wherein the power transmitting bands are chains, and the first and second pluralities of rollers are sprockets configured to interface with the chains.

3. The feederhouse conveyor system of claim 1, wherein the power transmitting bands are cogged belts or chains, and the first rollers and the second rollers are cogged pulleys, configured to interface with the cogged belts or chains.

4. The feederhouse conveyor system of claim 1, wherein the power transmitting bands are smooth.

5. The feederhouse conveyor system of claim 1, wherein the rigid cross members have a cross-sectional shape which is taller than a cross-sectional shape of the flexible cross members;
    wherein the cross-sectional shape of the rigid cross members is at least one of generally U-shaped, generally T-shaped, angle shaped, and generally rectangular; and
    wherein the cross-sectional shape of the flexible cross members is generally circular.

6. The feederhouse conveyor system of claim 1, wherein the rigid cross members attach near their ends to neighboring power transmitting bands, and are positioned in a staggered pattern.

7. The feederhouse conveyor system of claim 1, wherein some of the flexible cross members attach near their ends to neighboring power transmitting bands, and some of the flexible cross members attach near their ends to outermost power transmitting bands.

8. The feederhouse conveyor system of claim 1, wherein the flexible cross members attach near their ends to neighboring power transmitting bands, and are positioned in a staggered pattern.

9. The feederhouse conveyor system of claim 3, wherein the flexible cross members are substantially spaced along the power transmitting bands a distance equal to a pitch of a cogged belt of the cogged belts or chain of the chains.

10. The feederhouse conveyor system of claim 1, further comprising a mat configured to fill some or all spaces between adjacent flexible cross members and adjacent power transmitting bands.

11. The feederhouse conveyor system of claim 10, wherein the mat and the flexible cross members are configured to create an open area at least partially rearward of a trailing edge of the rigid cross members.

12. An agricultural harvesting machine comprising:
    a combine;
    a harvesting head assembly; and
    a feederhouse assembly configured to transport crop up and rearward from the harvesting head assembly to the combine, wherein the feederhouse assembly comprises:
        a feederhouse floor;
        a plurality of power transmitting bands configured to receive power from one or more driving rollers;
        a plurality of rigid slats fixedly connected near each end to neighboring power transmitting bands and positioned along the power transmitting bands in a staggered pattern;
        a plurality of flexible bars fixedly connected near each end to a power transmitting band, wherein the flexible bars are parallel to the rigid slats, wherein the plurality of flexible bars are separate from and positioned apart from the plurality of rigid slats along the power transmitting bands; and
        wherein the cross-sectional shape of the rigid slats is taller than the cross-sectional shape of the flexible bars.

13. The agricultural harvesting machine of claim 12, wherein the power transmitting bands are chains, and the driving rollers are sprockets configured to interface with the chains.

14. The agricultural harvesting machine of claim 12, wherein the power transmitting bands are cogged belts or chains, and the first and second pluralities of rollers are cogged pulleys, configured to interface with the cogged belts or chains.

15. The agricultural harvesting machine of claim 12, wherein the bands are smooth and at least one of the power transmitting bands are cogged and configured to interface with the rigid slats and the flexible bars.

16. The agricultural harvesting machine of claim 12, wherein the cross-sectional shape of the rigid slats is at least one of generally U-shaped, generally T-shaped, angle shaped, and generally rectangular, and the cross-sectional shape of the flexible bars is generally circular.

17. The agricultural harvesting machine of claim 12, wherein some of the flexible bars attach near their ends to neighboring power transmitting bands, and some of the flexible bars attach near their ends to outermost power transmitting bands.

18. The agricultural harvesting machine of claim 12, wherein the flexible bars attach near their ends to neighboring power transmitting bands, and are positioned in a staggered pattern.

19. The agricultural harvesting machine of claim 12, wherein the flexible bars attach near their ends to outermost power transmitting bands.

20. A feederhouse conveyor system for an agricultural machine, the feederhouse conveyor system comprising:

a power transmitting system; and
at least one rigid cross member configured to be driven by the power transmitting system; and
at least one flexible cross member configured to be driven by the power transmitting system, wherein the at least one flexible cross member is separate from and positioned apart from the at least one rigid cross member along the power transmitting system;
wherein the rigid cross member is configured to apply a pushing force to a crop with a leading edge when driven by the power transmitting system; and
wherein the flexible cross member is configured to apply a distributed load to a top of the crop.

21. A feederhouse conveyor system for an agricultural harvesting machine, the feederhouse conveyor system comprising:
   a power transmitting system comprising:
      a plurality of first rollers;
      a plurality of second rollers; and
      one or more power transmitting bands;
   a plurality of rigid cross members, configured to each attach near each end to at least one of the power transmitting bands;
   a plurality of flexible cross members, configured to each attach near each end to at least one of the power transmitting bands; and
   wherein centerlines which extend through the rigid cross members and the flexible cross members are parallel;
   wherein at least one of the rigid cross members or the flexible cross members attach near their ends to neighboring power transmitting bands and are positioned in a staggered pattern.

22. A feederhouse conveyor system for an agricultural machine, the feederhouse conveyor system comprising:
   a power transmitting system; and
   at least one rigid cross member configured to be driven by the power transmitting system; and
   at least one flexible cross member configured to be driven by the power transmitting system;
   wherein the rigid cross member is configured to apply a pushing force to a crop with a leading edge when driven by the power transmitting system; and
   wherein the flexible cross member is configured to apply a distributed load to a top of the crop;
   wherein at least one of the rigid cross members or the flexible cross members attach near their ends to neighboring power transmitting bands and are positioned in a staggered pattern.

23. A feederhouse conveyor system for an agricultural harvesting machine, the feederhouse conveyor system comprising:
   a power transmitting system comprising:
      a plurality of first rollers;
      a plurality of second rollers; and
      one or more power transmitting bands;
   a plurality of rigid cross members, configured to each attach near each end to at least one of the power transmitting bands;
   a plurality of flexible cross members, configured to each attach near each end to at least one of the power transmitting bands; and
   a mat configured to fill some or all spaces between adjacent flexible cross members and adjacent power transmitting bands;
   wherein centerlines which extend through the rigid cross members and the flexible cross members are parallel.

* * * * *